Nov. 7, 1950 E. ROSSNER 2,529,192
MOTOR POWERED VEHICLE CAB
Filed Sept. 20, 1945 2 Sheets-Sheet 1
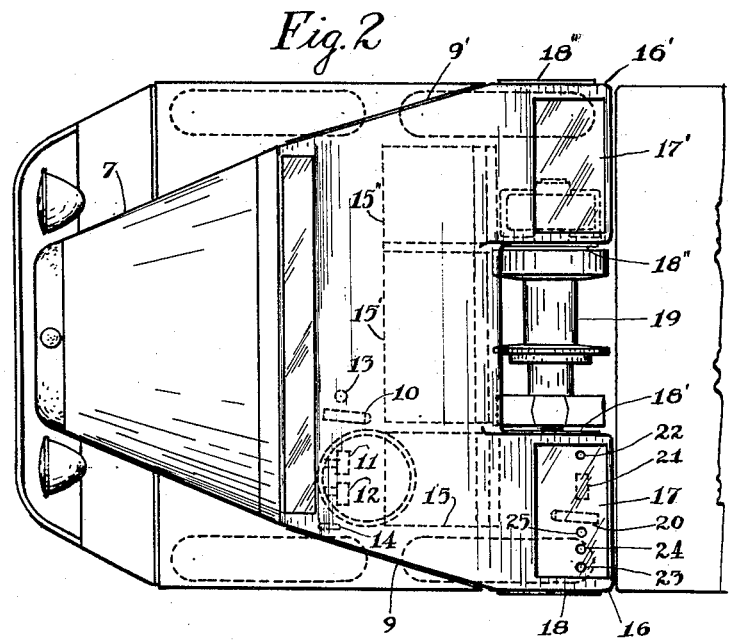
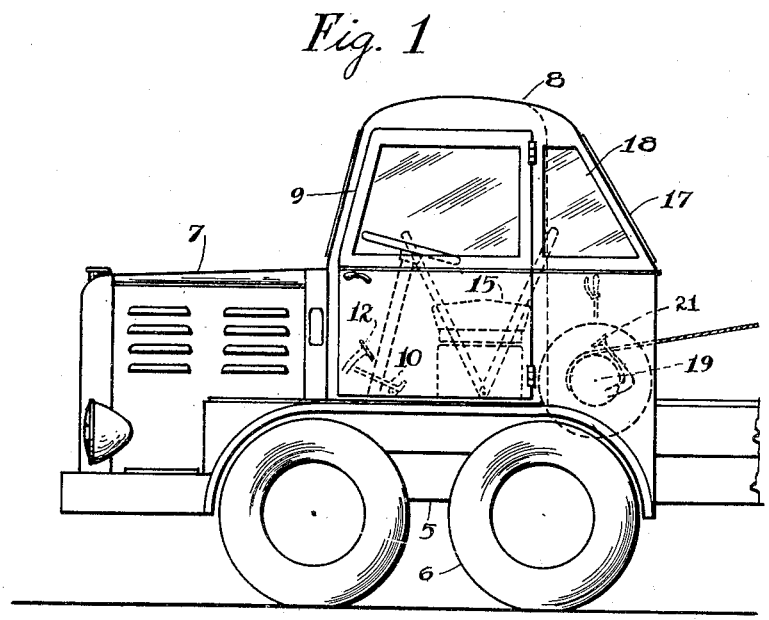
INVENTOR
Emery Rossner
BY
ATTORNEY Nov. 7, 1950 E. ROSSNER 2,529,192
MOTOR POWERED VEHICLE CAB
Filed Sept. 20, 1945 2 Sheets-Sheet 2
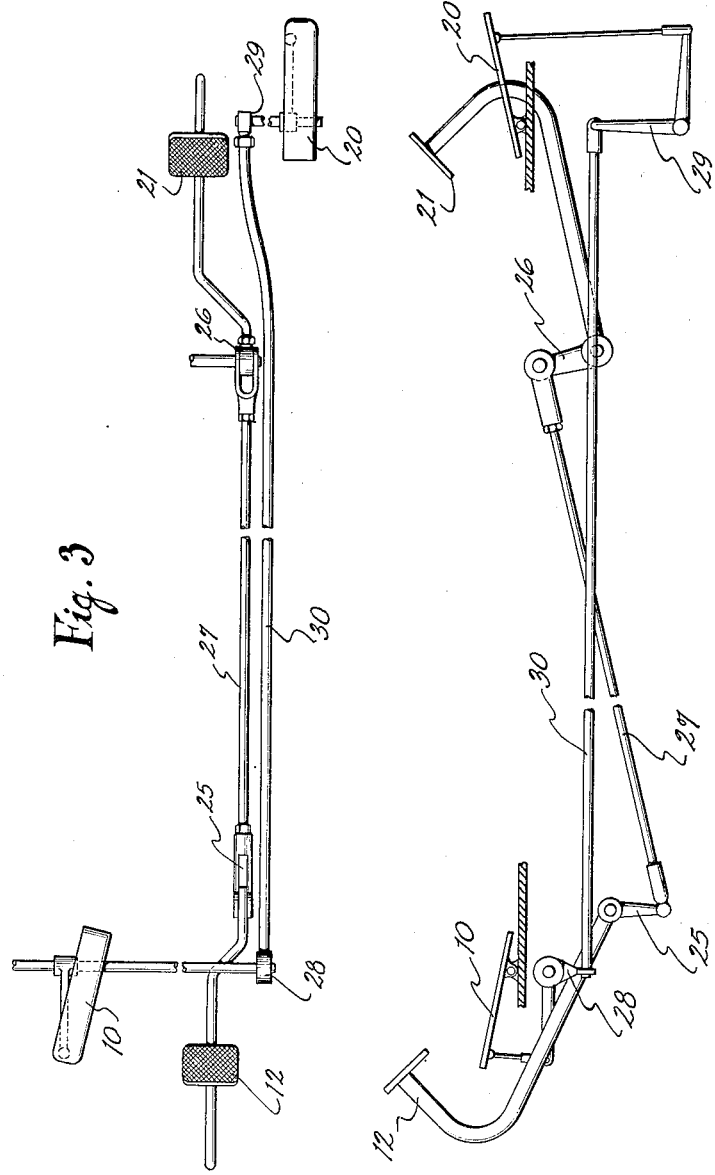
INVENTOR.
EMERY ROSSNER
BY
ATTORNEY Patented Nov. 7, 1950

2,529,192

UNITED STATES PATENT OFFICE 2,529,192

MOTOR POWERED VEHICLE CAB

Emery Rossner, Brooklyn, N. Y., assignor to Milford Crane & Machine Co., Milford, Conn., a corporation of Connecticut Application September 20, 1945, Serial No. 617,648

3 Claims. (Cl. 180—89)

My invention relates particularly to a cab for automotive commercial vehicles, such as automotive cranes and vehicles having hydraulic, air, electrical or mechanical auxiliary devices usually deriving power from the engine which operates the vehicle through a suitable power take-off.

The conventional cab serves only as a compartment for the driver. The controls for the auxiliaries are arranged either in front of the driver along with the usual controls provided for driving the vehicle or they are wholly or partly outside of the cab and usually behind the cab. These arrangements enhance danger and reduce comfort, efficiency and safety. When the driver is inside of the cab his back is turned toward the work which he can see by turning his head. Thus visibility is at a minimum. When the operator is obliged to be outside of the cab he is exposed to the elements and likely to be injured by flying parts, by entanglement or by breakage of parts. Considerable time is lost in getting from the driving to the operating position and vice versa.

To eliminate these objections, I have reconstructed the cab so that it has a rearward extension or control booth. The usual controls are located in the regular cab and the controls for the auxiliary devices are all located in the rear extension of the cab and readily accessible to the driver from his seat. Such an extension may be provided on each side and the space or well between the extensions may be used for instance by a winch which is visible from the extensions of the cab.

Fig. 1 is a side view of the front end of a motor vehicle having my improved cab.

Fig. 2 is a plan view of the same.

Fig. 3 is a plan view showing means for connecting the clutch pedal and the accelerator pedal for control of the vehicle with the clutch pedal and the accelerator pedal for control of the auxiliary power equipment.

Fig. 4 is a side view of the parts shown in Fig. 3.

The invention is applicable to any suitable type of chassis 5 with wheels 6 and a motor (not shown) in the hood 7. The cab 8 is of the conventional type with wells having windows for front and side vision and side doors 9.

The usual gas control pedal 10, brake pedal 11, clutch pedal 12, gear shift 13 and emergency brake handle 14 are all arranged adjacent the steering wheel for operation by the driver from seat 15 located at one side of the cab and which may be reversible.

Behind the seat 15, the cab is provided with an extension 16 constituting a control booth having a rear window 17 and side windows 18, 18'. Alongside of this booth in the rear of the cab and preferably in a depressed portion thereof is mounted auxiliary equipment such as a winch 19, or a compressor, generator, etc. (not shown), where it can be easily seen by the operator on the seat 15. This auxiliary equipment will have the usual gas pedal 20, clutch 21, brake 22, power take-off 23, boom control 24, swinger control 25 and other controls for the winch or other auxiliary equipment (not shown), to be operated in any conventional manner by the motor of the vehicle.

The front pedal 12 for controlling the clutch for the motor (not shown) may be connected to the clutch pedal 21 at the rear by bell crank levers 25 and 26 and connecting rod 27. Similarly the accelerator or gas pedals 10 and 20 may be connected by bell crank levers 28 and 29 and a rod 30 and connected to the gas control in any well known manner (not shown).

An extension 16' may be provided at the opposite side of the cab and the winch or other device mounted between the extensions. Suitable seats 15', 15" may be provided alongside of the seat 15. If a special operator is provided the auxiliary controls may be located in booth 16', which has windows 17' and 18" and a door 9' will ordinarily be provided.

Such a construction provides a maximum of convenience, safety and efficiency and economy of space and is pleasing in appearance. The operator is protected by the walls of the cab and booth, usually of metal and shatter-proof glass, and full view is afforded.

I claim:

1. A cab for an automotive vehicle having a winch comprising an enclosed main compartment for the operator, devices in said compartment for controlling the forward and backward movements of the vehicle, a seat in said compartment for the operator, a rearward enclosed extension of said main compartment on each side of said winch communicating with the interior of said compartment and each extension having rear and side windows and at least one extension having devices for controlling the operation of the winch.

2. A cab for an automotive industrial vehicle comprising walls forming a main compartment for the operator and for conventional vehicle controls and other walls at one side extending toward the rear from one side of the main compartment to form an auxiliary compartment forming a booth for controls for power apparatus to be located in rear of the center of the main compartment, the walls of both compartments having windows for permitting the operator in the main compartment to observe at the front and rear and from both sides of both compartments.

3. A cab for an automotive vehicle comprising walls forming a main compartment for the installation of vehicle control mechanism and having a front window and side windows and other walls extending rearwardly from the side walls of the main compartment at each side thereof and at each side of the central portion thereof to form auxiliary compartments and leaving a well between the auxiliary compartments for installation of auxiliary power equipment and having windows at the sides and rear of the auxiliary compartments.

EMERY ROSSNER.

REFERENCES CITED

The following references are of record in the file of this patent:

UNITED STATES PATENTS

| Number | Name | Date |
| --- | --- | --- |
| 1,422,558 | Gardiner | July 11, 1922 |
| 1,649,630 | Ward | Nov. 15, 1927 |
| 1,944,439 | Larsen | Jan. 23, 1934 |
| 1,971,413 | Johnson et al. | Aug. 28, 1934 |
| 2,031,399 | White | Feb. 18, 1936 |
| 2,250,902 | Betzelberger | July 29, 1941 |